Feb. 8, 1938.  M. LEACH  2,107,380
CULINARY DEVICE
Filed Dec. 17, 1936
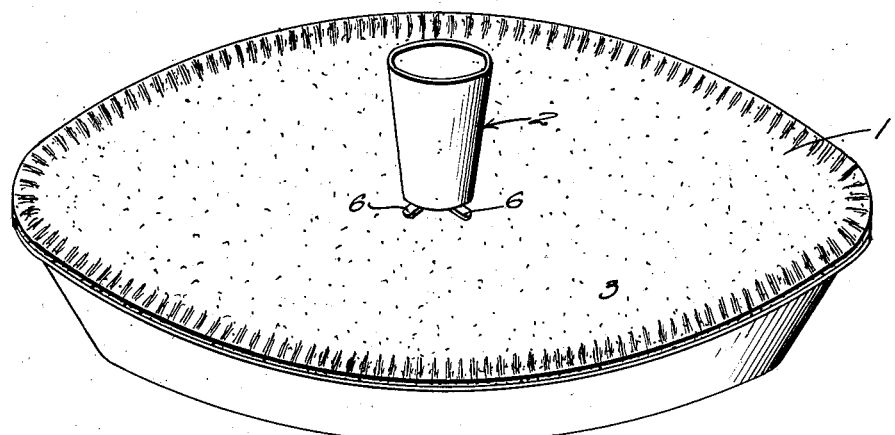
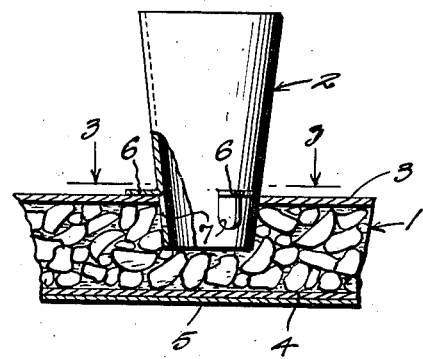
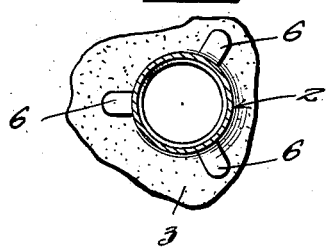
Inventor
M. Leach
By Watson E. Coleman
Attorney Patented Feb. 8, 1938

2,107,380

UNITED STATES PATENT OFFICE 2,107,380

CULINARY DEVICE

Maude Leach, Wilkes-Barre, Pa.

Application December 17, 1936, Serial No. 116,417

1 Claim. (Cl. 53—6)

This invention relates to improvements in devices for culinary uses and pertains particularly to a device designed for use in the baking of pies or other dishes having liquids therein.

The primary object of the present invention is to provide a novel device for use in the baking of pies or similar dishes which will prevent the juices under the pie-crust from being forced out onto the top of the crust by the development of steam thereunder.

A further object of the invention is to provide a novel device which may be readily placed in position in a top crust of a pie and which will allow the juices therein to rise under pressure developed under the crust by steam and flow back into the pie after the pressure has been relieved, so that none of the juices will come out onto the top of the crust or flow over the pie.

A further object of the invention is to provide a novel device for use in the above described manner, which is simple in design and which may therefore be economically produced for sale at a low price.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:

Figure 1 is a view in perspective of a pie showing the device embodying the present invention placed thereon.

Fig. 2 is a view in side elevation of the device showing in vertical section an adjacent portion of a pie or other similar dish and a part of the pan therefor.

Fig. 3 is a sectional view taken on the line 3—3 of Fig. 2.

Referring now more particularly to the drawing, the numeral 1 generally designates a pie, in association with which the device embodying the present invention is shown, the device being generally indicated by the numeral 2. In Fig. 2 the upper and lower crusts 3 and 4 respectively of the pie are shown together with a portion of the pie-pan which is indicated by the numeral 5. This figure illustrates the manner in which the device 2 is placed in an opening in the upper crust of the pie and shows how it is supported with its lower end in spaced relation with the bottom crust of the pie so that fluids in the pie will be free to flow upwardly into the device.

The device 2 is in the form of a truncated cone and is preferably formed of aluminum or any other suitable material which would not contaminate the food in association with which it is used. This hollow body 2 is preferably made about two inches in length and is used in inverted position as shown, that is, the end of greatest diameter forms the top of the body while the lower end which is of smaller diameter is inserted through the pie crust into the interior of the pie. Adjacent this narrower end of the body 2 there extend outwardly from the wall the wing-like projections 6 which are preferably struck out from the material of the hollow body as shown in Fig. 2. By striking out these projections 6 there will thus be formed openings 7 which will serve as an additional means for permitting steam and fluids to pass from beneath the top crust of the pie into the hollow cone-like body 2. These projections or wings 6 are placed approximately one-half inch from the lower or smaller end of the body, when the body is made approximately two inches in length as above described so that when the device is in position its lower end will be supported by the wings 6 in spaced relation with the bottom crust of the pie.

In the use of the device, the pie after being completed, has a suitable opening formed in its top crust, and the narrower end of the device is forced into this opening until the wing portions 6 come to rest upon the top of the crust. The device will then maintain its upright position in the manner shown, and as the pie is being cooked and expansion of the liquids takes place therein together with the formation of steam, the liquids will rise in the hollow body 2 instead of being forced out onto the top of the pie crust, as would be the case if the device were not used and the top crust were provided with the usual steam escape openings which are ordinarily made therein by the use of a knife or fork. After the pie has been cooked and as it cools, the liquids will flow back from the device 2 into the pie and will thus be entirely saved and in addition the appearance of the pie will not be spoiled.

What is claimed, is:

A device of the character described, comprising a hollow conical body open at each end, the end of smallest diameter being designed for extension through an opening in a pie top crust, and outwardly extending wing-like members forming integral struck-out portions of the material of said body to rest upon the top of a pie top crust when the adjacent end of the body is extended through the said opening in the top crust, the openings resulting in the body from the striking out of said portions being between said portions and the narrow end of the body to be located immediately beneath the undersurface of the said crust when the device is in position for use.

MAUDE LEACH.